US008355487B2

(12) United States Patent
Cai (10) Patent No.: US 8,355,487 B2
(45) Date of Patent: Jan. 15, 2013

(54) MULTIPLE MAXIMUM DURATIONS DEFINED FOR SESSIONS OVER A COMMUNICATION NETWORK

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1317 days.

(21) Appl. No.: 11/833,763

(22) Filed: Aug. 3, 2007

(65) Prior Publication Data
US 2009/0034702 A1 Feb. 5, 2009

(51) Int. Cl.
*H04M 15/00* (2006.01)
(52) U.S. Cl. ............................. 379/114.2; 379/114.17
(58) Field of Classification Search .............. 379/114.03, 379/114.15, 114.17, 114.2; 455/405, 406
See application file for complete search history.

(56) References Cited

U.S. PATENT DOCUMENTS

| | | | | |
|---|---|---|---|---|
| 6,597,774 B1 * | 7/2003 | Jennings et al. | ......... | 379/114.07 |
| 6,633,768 B2 * | 10/2003 | Hurme et al. | ................ | 455/565 |
| 6,665,387 B2 * | 12/2003 | Hannu | ..................... | 379/114.16 |
| 6,735,290 B1 * | 5/2004 | Rauba | ...................... | 379/114.16 |
| 6,760,418 B1 * | 7/2004 | Abbasi et al. | ............ | 379/115.01 |
| 2008/0096524 A1 * | 4/2008 | True et al. | ..................... | 455/406 |

* cited by examiner

*Primary Examiner* — Quoc D Tran
(74) *Attorney, Agent, or Firm* — Duft Bornsen & Fishman LLP (57) ABSTRACT

Communication networks and associated methods and systems are disclosed that provide dynamically-configurable maximum durations for sessions over a communication network. For a session, the communication network determines the traditional static maximum duration and the calculated maximum duration (for prepaid sessions). In addition to these maximum durations, the communication network also determines a dynamic maximum duration for the session based on duration criteria. The communication network then selects one of the maximum durations based on the duration criteria, and monitors the session based on the selected maximum duration. By defining the duration criteria in a particular manner, a new dynamically-configured maximum duration for sessions may be used instead of relying only on the static maximum duration and the calculated maximum duration (for prepaid sessions).

38 Claims, 5 Drawing Sheets

*FIG. 5* ated maximum duration (for prepaid sessions). Thus, when a session is set up over the communication network, the network determines the traditional static maximum duration and the calculated maximum duration (for prepaid sessions). In addition, according to features and aspects of the invention, the network also determines a dynamic maximum duration for the session based on the duration criteria. The communication network then selects one of the maximum durations, and monitors the session based on the selected maximum duration. By defining the duration criteria in a particular manner, the party and/or the network operator may advantageously create a new dynamically-configured maximum duration for sessions instead of relying only on the static maximum duration and the calculated maximum duration (for prepaid sessions). And by updating the duration criteria, the new maximum duration may advantageously be dynamically changed to suit the desires of the party or the network operator. The party and the network operator consequently have more control over the maximum length of a session over the communication network.

MULTIPLE MAXIMUM DURATIONS DEFINED FOR SESSIONS OVER A COMMUNICATION NETWORK

BACKGROUND OF THE INVENTION

1. Field of the Invention

The invention is related to the field of communications and, in particular, to providing multiple maximum durations for prepaid or postpaid sessions made over a communication network. More particularly, in addition to a statically-defined maximum duration defined for all sessions over a communication network, a dynamically-configurable maximum duration is defined for sessions initiated by a particular party.

2. Statement of the Problem

Communication networks typically have a maximum duration defined to avoid extraordinarily long sessions (i.e., voice calls, data sessions, etc) from taking up bandwidth on the network. The maximum duration implemented in most if not all communication networks is statically defined for all sessions. The static maximum duration is typically 72 hours. To implement the static maximum duration, network operators program the switches or servers in the communication network with the maximum duration. The switches or servers then monitor the duration of sessions over the communication network and terminate any sessions that exceed the maximum duration. As an example, network operators may program Mobile Switching Centers (MSC) in a cellular network with a static maximum duration of 72 hours. Any session exceeding 72 hours in duration is terminated by the MSC that is serving that session.

The duration of a prepaid session is further limited by the account balance of the prepaid party that is participating in the session. For instance, if a prepaid party has an account balance of 2 hours (based on a present rating), then the maximum duration for a session from that prepaid party is not only limited by the static maximum duration, but also by the account balance of the prepaid party. Any session exceeding 2 hours in duration will be terminated by the communication network unless the prepaid party replenishes the account. Some communication networks may notify the prepaid party of the account balance so that the party is aware of the maximum duration.

One problem with both prepaid and postpaid services is that the network operator or the party cannot presently define a maximum duration in a flexible manner. For postpaid services, the only maximum duration available to a party is the static maximum duration defined in the communication network, which is typically 72 hours. For prepaid services, only the static maximum duration and the maximum duration that is calculated based on the account balance of the prepaid party exist to control the duration of sessions. A party or a network operator may want to define other maximum durations that are shorter than the static maximum duration or the calculated maximum duration (for prepaid services). For example, if a parent gives a child a cellular phone, the parent may want to define a maximum duration of 20 minutes, 30 minutes, 60 minutes, etc, for the sessions involving that cellular phone. The parent may further want to define a maximum duration of 30 minutes for voice calls, and a maximum duration of 2 hours for gaming. In another example, a network operator may want to define a maximum duration of one hour during a time when the communication network is highly congested, and define a maximum duration of three hours during a time when the communication network is not congested. A dynamic maximum duration such as this is not presently available.

SUMMARY OF THE SOLUTION

The invention solves the above and other problems by providing dynamically-configurable maximum durations for sessions in a communication network. A party to a session and/or a network operator may define duration criteria that are used to determine the maximum duration for a session in addition to the static maximum duration and the calcul In one embodiment of the invention, the communication network receives a setup message for a prepaid session. The communication network identifies a first maximum duration for the prepaid session that is statically defined in the communication network. The communication network calculates a second maximum duration for the prepaid session based on a prepaid account balance for a party participating in the prepaid session. The communication network also determines a third maximum duration for the prepaid session that is dynamically-configurable based on duration criteria defined by the network operator and/or the party to the prepaid session. The communication network then selects one of the first, second, or third maximum duration based on the duration criteria. When the maximum duration is selected, the communication network may also notify the party of the selected maximum duration. The communication network then monitors the duration of the prepaid session based on the selected maximum duration.

In another embodiment of the invention, the communication network receives a setup message for a postpaid session. The communication network identifies a first maximum duration for the postpaid session that is statically defined in the communication network. The communication network determines a second maximum duration for the postpaid session that is dynamically-configurable based on duration criteria defined by the network operator or the party to the postpaid session. The communication network then selects one of the first or second maximum duration based on the duration criteria. When the maximum duration is selected, the communication network may also notify the party of the selected maximum duration. The communication network then monitors the duration of the postpaid session based on the selected maximum duration.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
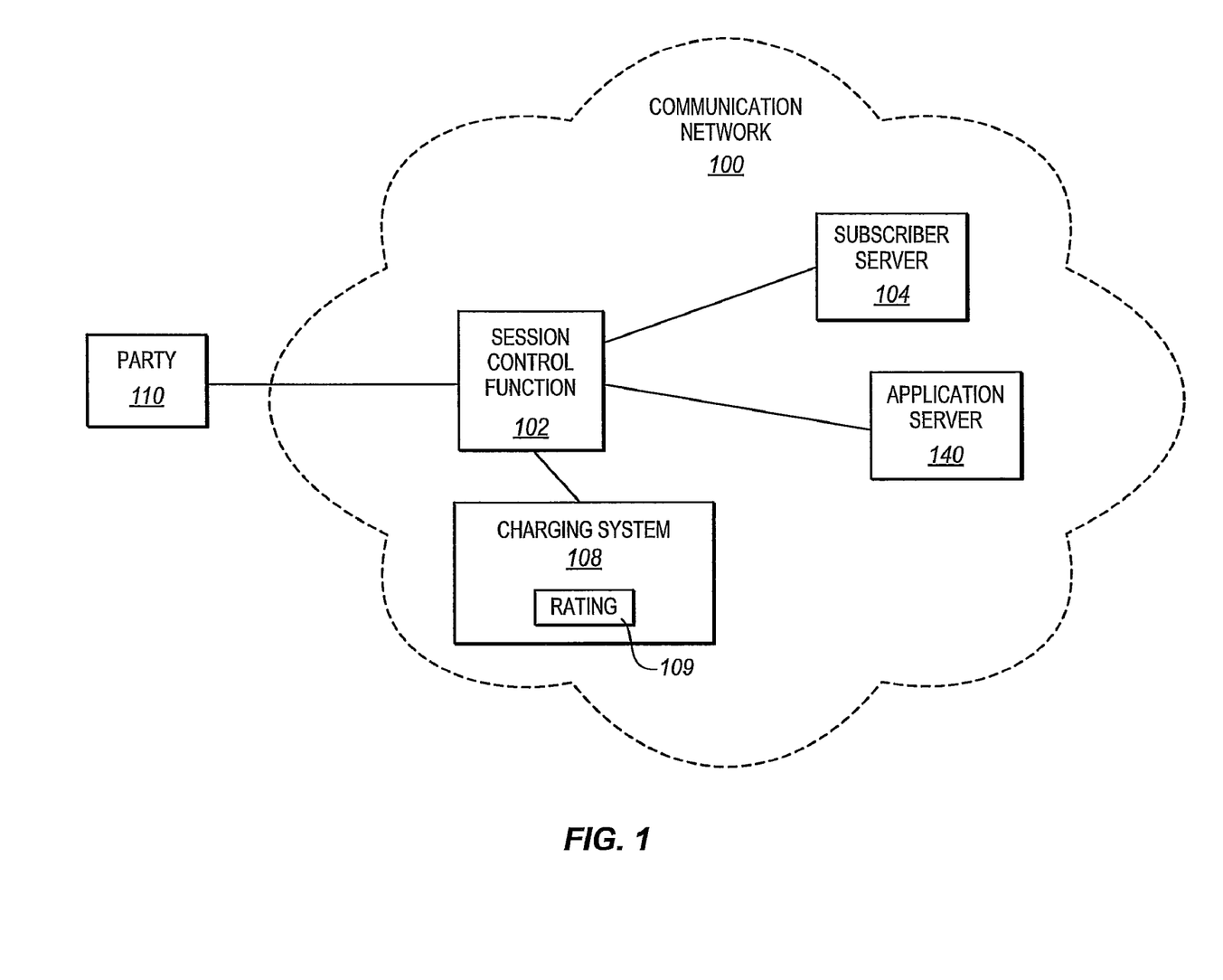
FIG. 1 illustrates a communication network in an exemplary embodiment of the invention.

FIG. 1 illustrates a communication network 100 in an exemplary embodiment of the invention. Communication network 100 may comprise an IMS network, a PSTN, a CDMA network, a GSM network, or another type of communication network. Communication network 100 includes a session control function (SCF) 102 and a subscriber server 104. Session control function (SCF) 102 comprises any system, server, or application adapted to serve a session (alternatively referred to as a call) for a party 110 over communication network 100. Examples of session control function 102 include an MSC in a cellular network and a Call Session Control Function (CSCF) in an IMS network. Subscriber server 104 comprises any database, server, or application adapted to store and maintain subscriber information or subscriber data for one or more subscribers, such as party 110. For instance, subscriber server 104 may maintain subscriber data in the form of a subscriber record or subscriber profile. Subscriber server 104 may comprise a single centralized system or may be distributed among multiple systems. If implemented in multiple systems, then the systems communicate to maintain common subscriber data. Subscriber server 104 may comprise a Home Location Register (HLR), such as a Super-Distributed HLR (S-DHLR) from Lucent Technologies. Subscriber server 104 may alternatively comprise a Home Subscriber Server (HSS) or a combined HLR/HSS.

Communication network 100 may also include a charging system 108. Charging system 108 comprises any element, system, or server adapted to provide prepaid charging or postpaid charging for sessions in communication network 100. If providing prepaid charging, then charging system 108 maintains a prepaid account for party 110 and is adapted to provide online charging for sessions in which party 110 is a participant. If providing postpaid charging, then charging system 108 maintains a postpaid account for party 110 and is adapted to provide offline charging for sessions in which party 110 is a participant. Charging system 108 may further include a rating engine 109 adapted to rate sessions over communication network 100.

Communication network 100 may also include an application server 140. Application server 140 is adapted to provide any desired function in communication network 100. For example, application server 140 may comprise a gaming server, an email server, or another type of server.

According to features and aspects herein, communication network 100 is adapted to provide multiple maximum durations for a session. As described in the Background, a network operator may program communication network 100 to have a static maximum duration, such as 72 hours. The static maximum duration is programmed into session control function 102 and/or other session control functions not shown. If a session over communication network 100 is a prepaid session, then another maximum duration exists based on the account balance of a party participating in the prepaid session. For instance, if party 110 is a prepaid subscriber, then communication network 100, or more particularly session control function 102, may calculate another maximum duration based on a prepaid account balance for party 110. The prepaid account balance is maintained in charging system 108.

In addition to these maximum durations presently existing, communication network 100 further allows for another maximum duration to be dynamically-configured in a flexible manner. The dynamic maximum duration of a session may be a service provided in communication network 100 (i.e., a maximum duration service). The dynamic maximum duration of a session is determined based on duration criteria that are defined by the network operator, by party 110, and/or by another entity, as will be further described in detail below. The dynamic maximum duration may be provisioned as a new parameter in a subscriber's account. The subscriber, such as party 110, may subscribe to the maximum duration service, such as for a fee. Communication network 100 may also provide the maximum duration service without subscription by party 110. Such a maximum duration service was not previously provided in communication networks.

The duration criteria used to determine a dynamic maximum duration may be defined based on characteristics of communication network 100, based on characteristics of party 110, based on characteristics of a session, or based on other characteristics. Examples of duration criteria are described in detail below. Duration criteria comprise pre-defined rules or policies that control how a maximum duration is determined for a session. "Pre-defined" means that the duration criteria are not defined at the initiation of a session, such as by the party initiating the session, but is rather defined prior to initiation of a session. For instance, when party 110 subscribes to a service from communication network 100 (see FIG. 1), party 110 may define certain duration criteria as part of the service. Further, party 110 may change the duration criteria at another time, such as through a service portal provided by a service provider operating communication network 100. In addition to the duration criteria defined by party 110, the network operator of communication network 100 may pre-define certain duration criteria, such as when the service is initially activated.

Duration criteria allow a party to pre-define a maximum duration for each session involving a particular party or a particular communication device. To pre-define means that the party does not have to provide input at the beginning of a session or during a session to define a maximum duration (although the party may provide input to change or extend a maximum duration). The duration criteria are pre-defined so that the network may process the duration criteria at the initiation of a session to determine the maximum duration.

Figure 2:
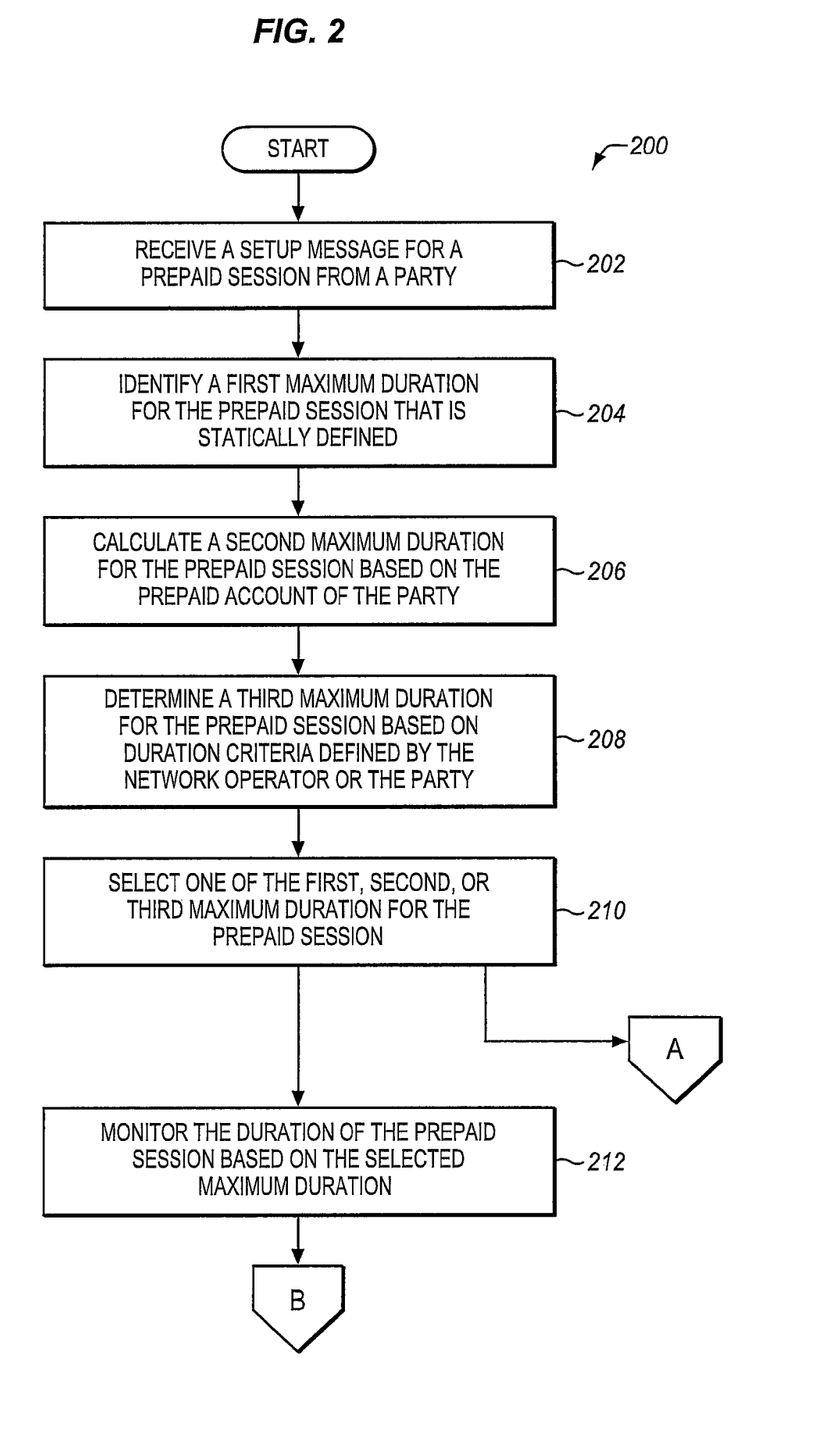
FIG. 2 is a flow chart illustrating a method of providing dynamically-configurable maximum durations for prepaid sessions in an exemplary embodiment of the invention.

FIG. 2 is a flow chart illustrating a method 200 of providing dynamically-configurable maximum durations for prepaid sessions in an exemplary embodiment of the invention. The steps of method 200 will be described with reference to communication network 100 in FIG. 1. The steps of the flow chart in FIG. 2 are not all inclusive and may include other steps not shown. The steps of method 200 are described as being performed by session control function 102, but one or more of the steps of method 200 may be performed by another node or nodes in communication network 100, such as subscriber server 104.

In step 202, session control function 102 receives a setup message to initiate a prepaid session. The setup message may comprise a SIP INVITE message, an ISUP IAM message, or another type of message. The prepaid session may comprise any type of session (or call), such as a voice session, a data session (e.g., email, Internet, or IM), a gaming session, etc.

Responsive to the prepaid session being initiated, session control function 102 identifies a first maximum duration for the prepaid session that is statically defined in communication network 100 in step 204. As previously discussed, communication network 100 includes a static maximum duration, such as 72 hours, that is programmed into network nodes, such as session control function 102. This static maximum duration applies to all prepaid and postpaid sessions in communication network 100.

In step 206, session control function 102 calculates a second maximum duration for the prepaid session based on a prepaid account balance for party 110. Because party 110 is a prepaid user in this embodiment, party 110 has a prepaid account that is maintained in charging system 108. The prepaid account has a balance at the beginning of the prepaid session. The duration of the prepaid session is thus limited by the balance in the prepaid account and the present rating for the prepaid session. Session control function 102 may query charging system 108 to obtain the account balance for party 110, and then calculate the second maximum duration based on the account balance.

In step 208, session control function 102 determines a third maximum duration for the prepaid session that is dynamically-configurable based on the duration criteria that is defined by the network operator and/or party 110. In step 210, session control function 102 selects the first maximum duration, the second maximum duration, or the third maximum duration for the prepaid session based on the duration criteria. Session control function 102 may select the maximum duration for the prepaid session in a variety of ways based on policies or rules included in the duration criteria. In one example, session control function 102 may select the maximum duration that is the shortest. For instance, if the first "static" maximum duration is 72 hours, the second "calculated" maximum duration is 20 hours, and the third "dynamic" maximum duration is 1 hour, then session control function 102 may select the dynamic maximum duration which has the shortest length of 1 hour. In another example, session control function 102 may select the second "calculated" maximum duration for all prepaid sessions in communication network 100.

Figure 3:
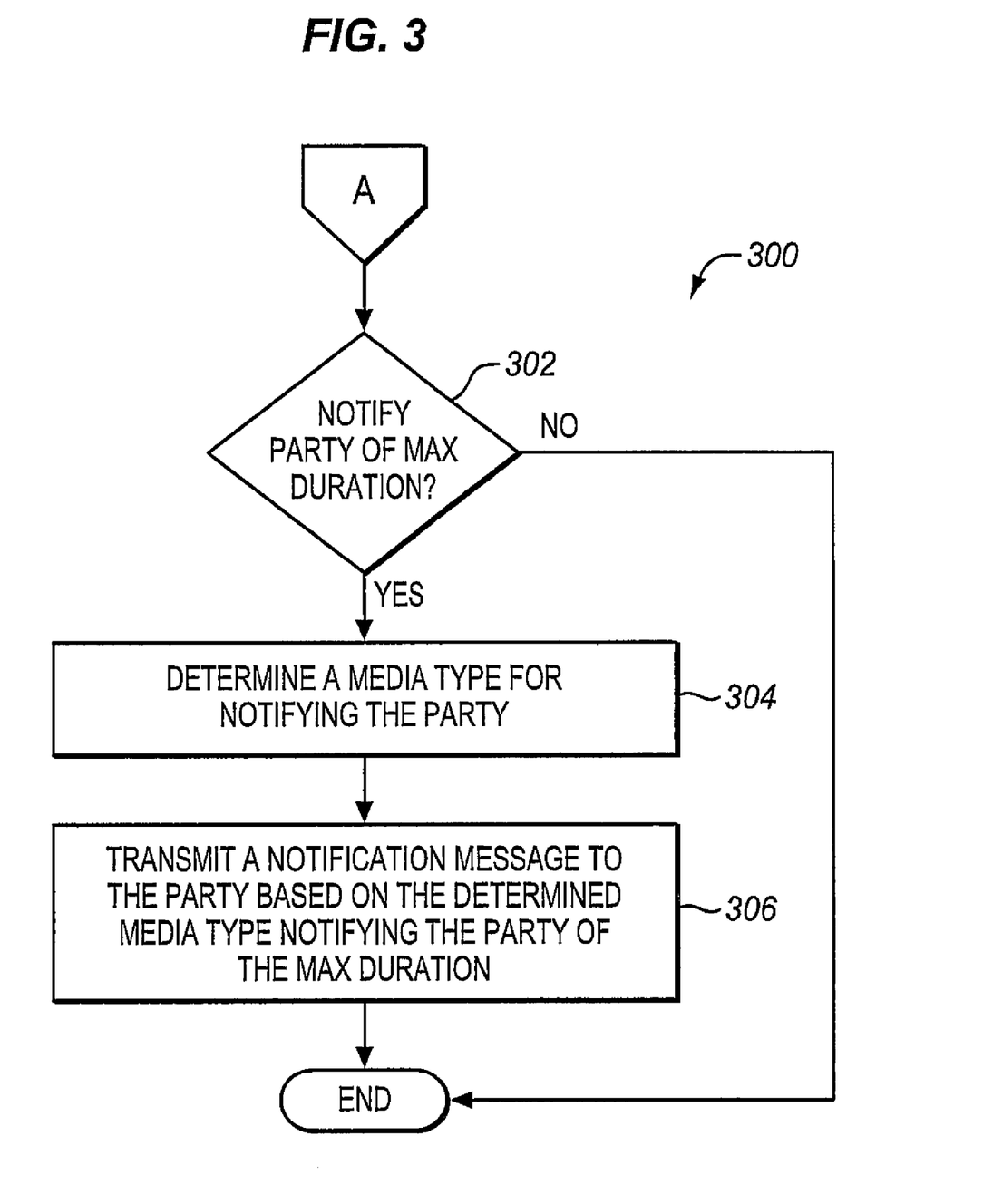
FIG. 3 is a flow chart illustrating a method of notifying a party of a maximum duration for a session in an exemplary embodiment of the invention.

Session control function 102 may also determine whether to notify party 110 of the selected maximum duration for the prepaid session. FIG. 3 is a flow chart illustrating a method 300 of notifying party 110 of the selected maximum duration for a session in an exemplary embodiment of the invention. The steps of the flow chart in FIG. 3 are not all inclusive and may include other steps not shown.

In step 302, session control function 102 determines whether to notify party 110 of the selected maximum duration for the prepaid call. The notification will be provided either pre-session or during the session. The determination may be made based on the duration criteria defined for prepaid sessions. As one example, the duration criteria may define that pre-session notification is provided if either the second "calculated" maximum duration or the third "dynamic" maximum duration is selected. Notification is not provided if the first "static" maximum duration is selected because this maximum duration is rarely if ever reached. In another example, the duration criteria may define that pre-session notification depends on media type for the session. For instance, voice sessions typically have shorter durations (e.g., 10 minutes or less), so pre-session notification may not be provided for voice sessions. Data sessions (e.g., a gaming session) on the other hand typically have longer durations (e.g., several hours), so pre-session notification may be provided for data sessions.

In step 304, session control function 102 determines a media type for notifying party 110 of the maximum duration for the prepaid session. Again, session control function 102 may process the duration criteria to determine the proper media type for notifying party 110. For example, session control function 102 may determine that the media type for notification for a voice session is a voice announcement. In another example, session control function 102 may determine that the media type for notification for a data session is a text message. In step 306, session control function 102 transmits a notification message to party 110 based on the determined media type notifying party 110 of the selected maximum duration for the prepaid session.

After notifying party 110 of the selected maximum duration, session control function 102 may also give party 110 the option to change the selected maximum duration. For example, the selected maximum duration may be too long and may be too costly for party 110. Or, the selected maximum duration may be too short and party 110 is certain that the prepaid session will go longer than the selected maximum duration. Session control function 102 may also provide party 110 with instructions to change the selected maximum duration. If party 110 wants to change the maximum duration for the prepaid session, then session control function 102 receives a request to change the maximum duration from party 110. The request may include an indication of how party 110 wants to change the maximum duration. Responsive to receiving the request to change the maximum duration, session control function 102 determines whether the maximum duration may be changed by based on the duration criteria. If the maximum duration cannot be changed as requested by party 110, then session control function 102 informs party 110 as such. If the maximum duration may be changed, then session control function 102 changes the selected maximum duration as requested by party 110.

After the maximum duration for the prepaid session is selected and notification is optionally performed, the prepaid session is established over communication network 100. The prepaid session may be connected to application server 140 in communication network 100, such as a gaming server, an email server, etc, such as for a data session. The prepaid session may alternatively be connected to another party (not shown) in communication network 100 or another network, such as for a voice call. During the prepaid session, session control function 102 monitors the duration of the prepaid session based on the selected maximum duration in step 212 (see FIG. 2). Session control function 102 monitors when the prepaid session reaches or is close to reaching the selected maximum duration for the prepaid session.

Figure 4:
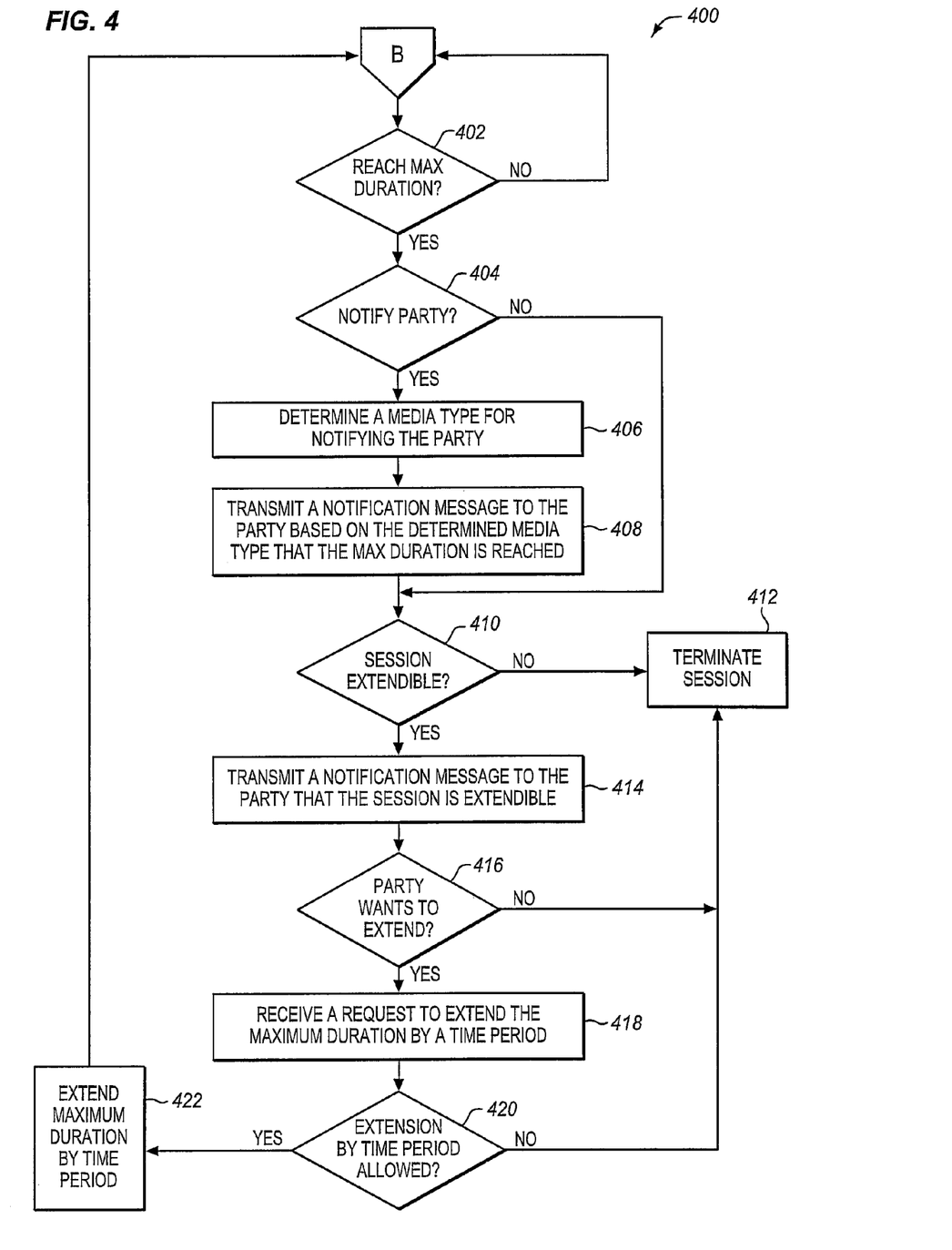
FIG. 4 is a flow chart illustrating a method of serving a session when a maximum duration is reached in an exemplary embodiment of the invention.

FIG. 4 is a flow chart illustrating a method 400 of serving a session when a selected maximum duration is reached in an exemplary embodiment of the invention. The steps of the flow chart in FIG. 4 are not all inclusive and may include other steps not shown. The steps of method 400 are also not in any particular order and the steps of method 400 may be performed in a different order than is illustrated in FIG. 4.

In step 402 of method 400, session control function 102 determines whether the duration of the prepaid session has reached or substantially reached the selected maximum duration. If the selected maximum duration has not been reached, then session control function 102 continues to monitor the duration of the prepaid session. If the selected maximum duration has been reached or substantially reached (e.g., the duration of the prepaid session is within a threshold time period to the selected maximum duration), then session control function 102 determines whether to notify party 110 that the selected maximum duration has been reached or is approaching in step 404. The determination of whether to notify party 110 may be made based on the duration criteria. As one example, the duration criteria may define that notification depends on network traffic. For instance, notification may not be provided if communication network 100 is congested, but will be provided if communication network 100 has adequate capacity. If a determination is made that notification is proper, then session control function 102 determines a media type for notifying party 110 that maximum duration has been reached or is approaching in step 406. Again, session control function 102 may process the duration criteria to determine the proper media type for notifying party 110. For example, session control function 102 may determine that the media type for notification for a voice session is a voice announcement. In another example, session control function 102 may determine that the media type for notification for a data session is a text message. In step 408, session control function 102 transmits a notification message to party 110 based on the determined media type notifying party 110 that the maximum duration for the session has been reached or is approaching.

In step 410, session control function 102 determines whether the prepaid session is extendible beyond the selected maximum duration. Session control function 102 processes the duration criteria to determine whether the prepaid session is extendible. If the prepaid session is not extendible, then session control function 102 terminates the prepaid session when the selected maximum duration is reached (if it is not already reached) in step 412. If the prepaid session is extendible, then session control function 102 transmits a notification message to party 110 indicating that the prepaid session is extendible in step 414.

Session control function 102 then determines if party 110 wants to extend the prepaid session. For instance, after transmitting the notification message to party 110, session control function 102 waits for a response from party 110. Session control function 110 may set a timer upon transmitting the notification message in step 414, and wait for a response from party 110. If no response is received when the timer expires, then session control function 102 may determine that party 110 does not want to extend the prepaid session. If party 110 does want to extend the prepaid session, then session control function 102 receives a request to extend the prepaid session from party 110 in step 418. The request may include a time period that party 110 wants to extend the prepaid session, such as 10 minutes, 30 minutes, 1 hour, etc. The request may also be for a default time period extension that is either statically defined in communication network 100 or dynamically defined in the duration criteria defined for party 110.

The notification message that was transmitted in step 414 may include information on how long the prepaid session may be extended and how many times the prepaid session may be extended. For instance, the notification message may inform party 110 that the prepaid session may be extended by 10 minutes, and may be extended 3 times. The number of times the prepaid session may be extended may be also defined by the duration criteria.

Responsive to receiving the request to extend the prepaid session by the time period, session control function 102 determines whether the prepaid session may be extended by the requested time period in step 420. If the session cannot be extended by the time period, then session control function 102 terminates the prepaid session. Before terminating the prepaid session, session control function 102 may inform party 110 that the prepaid session cannot be extended by the requested time period, and may request that party 110 define a new and shorter time period for the extension. If the session can be extended by the time period, then session control function 102 extends the maximum duration by the time period requested by party 110. Session control function 102 then monitors the duration of the prepaid session based on the extended maximum duration.

In the above embodiment, many determinations hi communication network 100 are made based on duration criteria. Session control function 102 executes service logic based on the duration criteria to determine a dynamic maximum duration and other characteristics for each session involving party 110. The duration criteria may be stored in subscriber server 104, such as in a subscriber profile for party 110. Session control function 102 may thus query subscriber server 104 for the duration criteria defined for party 110. In one alternative, session control function 102 may store some or all of the duration criteria locally.

In another alternative, session control function 102 may store some duration criteria, and subscriber server 104 may also store some duration criteria. In such an example, session control function 102 may store duration criteria that apply to each session over communication network 100 regardless of the parties to the session. The duration criteria that is stored in session control function 102 may be defined by a network operator because it applies to each session over the communication network 100. At the same time, subscriber server 104 may store duration criteria that apply to party 110 in a subscriber profile for party 110. The duration criteria that are stored in subscriber server 104 may be defined by party 110 because it applies only to sessions involving party 110.

Other parties (not shown in FIG. 1) being served by communication network 100 may also have duration criteria that are defined for sessions involving these parties. The following paragraphs illustrate some examples of duration criteria that may be defined for sessions over communication network 100.

One example of duration criteria is an account type for party 110. An account type may include the type of charging used for party 110, such as a prepaid user, a postpaid user, etc. The account type may also include the type of connectivity that party 110 has with communication network 100, such as wireline, wireless, Internet, etc. As an example, the duration criteria may define that a prepaid user is allowed a maximum duration of 1 hour while a postpaid user is allowed a maximum duration of 3 hours.

Another example of duration criteria is a service type for the session. A service type may include a calling card session, a session over a Virtual Private Network (VPN), a three way session, etc.

Another example of duration criteria is a session type. A session type may include a local session, an international session, a toll session, a toll-free session, an emergency session, etc. As an example, the duration criteria may define a maximum duration of 5 hours for a local voice call, may define a maximum duration of 1 hour for an international voice call, and may define no maximum duration for emergency calls.

Another example of duration criteria is a media type for a session. A media type may include a voice session (e.g., a voice call), a data session (e.g., email, Internet, gaming), a text session, a multimedia session, etc. As an example, the duration criteria may define a maximum duration of 1 hour for a voice session, and may define a maximum duration of 5 hours for a data session (e.g., a gaming session).

Another example of duration criteria is a tariff range. A session may be established during a high tariff time or a low tariff time, which may affect the maximum duration allowed for the session. For instance, the duration criteria may define that the maximum duration of a session is longer (i.e., 3 hours) during a high tariff time, and is shorter (i.e., 1 hour) during a low tariff time.

Another example of duration criteria is a time of day or day of the week. For instance, the maximum duration of a session may be longer (i.e., 3 hours) during evening and night times, but shorter (i.e., 1 hour) during the normal "work" day. In another instance, the maximum duration of a session may be longer during a weekend, but shorter during the week days.

Another example of duration criteria is present or substantially real-time characteristics of communication network 100. For instance, one characteristic of communication network 100 that may be used is network traffic or network capacity. The level of traffic over communication network 100 may change based on certain conditions in the network, such as time of day, equipment failures, emergencies or disasters causing localized high-traffic areas, etc. The maximum duration of a session may thus change based on the present conditions of communication network 100. For instance, if communication network 100 is congested or is running with an available bandwidth below some threshold, then the maximum duration of the session may be shorter than if the communication network 100 is running with an available bandwidth above the threshold.

Another example of duration criteria is characteristics of party 110. Characteristics of party 110 may comprise an identifier of party 110, an age or gender of party 110, a history of use by party 110, etc. Another characteristic of party 110 may be the access network type through which party 110 is receiving service. The access network type may include a PSTN network, a CDMA network, a GSM network, a UMTS network, an IMS network, a WiFi network, a WiMAX network, etc. As an example, if the access network type for party 110 is WiFi, then the maximum duration may be longer as WiFi is a relatively inexpensive communication medium for party 110. If the access network type for party 110 is PSTN, then the maximum duration may be shorter, especially if charging for the PSTN session is by the minute at a higher rate.

Any of the above duration criteria and other duration criteria not specifically described herein may be used to determine a maximum duration for a session. The duration criteria defined for party 110 may include criteria that apply to multiple parties using communication network 100, and may also include criteria that is specific to party 110. This allows party 110 the ability to define certain criteria that is specific to a certain communication device (e.g., cell phone) or account. As one example, assume that party 110 has a cellular phone. Party 110 may thus define through the duration criteria that the maximum duration of voice calls involving the cellular phone is 30 minutes and that the maximum duration of data sessions involving the cellular phones is 1 hour. This duration criteria will be specific to sessions involving this cellular phone of party 110, and does not apply to other sessions of other parties.

In another example, assume that party 110 has subscribed to a joint service plan (or family plan) having a plurality of members. Party 110 may assign a maximum duration for each member of the plan through the duration criteria. For instance, assume that two members of the plan are parents and two members of the plan are children. Party 110 may then define a maximum duration of ten hours for the parents, define a maximum duration of one hour for one of the children, and define a maximum duration of 30 minutes for the other child. Party 110 may thus advantageously define different maximum durations for each member of a joint service plan, which allows party 110 more control over how the members of the plan are communicating.

To handle the joint service plan, session control function 102 receives the setup message for a session. Session control function 102 processes the setup message to identify party 110, such as through a subscriber ID, through a directory number, through a network address, or some other information. Session control function 102 then identifies the duration criteria that have been defined for the identified party 110. For instance, if party 110 comprises a child of a joint service plan, then session control function 102 identifies the duration criteria defined for that party 110. Session control function 102 then determines a maximum duration based on the duration criteria for the identified party 110. Session control function 102 may thus determine different maximum durations for different parties of the same joint service plan.

Because the duration criteria may be defined for many different characteristics of a session and party 110, there may be conflicts among the different duration criterion. When a conflict arises, there may be priorities assigned to the duration criterion to determine which maximum duration should be assigned to the session. For example, if one duration criterion defines that the maximum duration for a data session is 5 hours and another duration criterion further defines that the maximum duration for a toll session is 1 hour, then there may be a priority assigned to one or both of the duration criterion to determine which one controls in the event of a data/toll session. As an example, duration criterion defined by the network operator may have priority over duration criterion defined by party 110. The service logic in session control function 102 that is processing the duration criteria may alternatively resolve any conflicts, such as by choosing the shortest of the maximum durations determined from the duration criteria.

The method in FIG. 2 illustrates a scenario for a prepaid session. A similar method is performed for postpaid sessions. For postpaid sessions, the maximum duration defined by the account balance of the user does not exist. Thus, the maximum durations are the static maximum duration defined in communication network 100, and the dynamic maximum duration determined based on the duration criteria.

Figure 5:
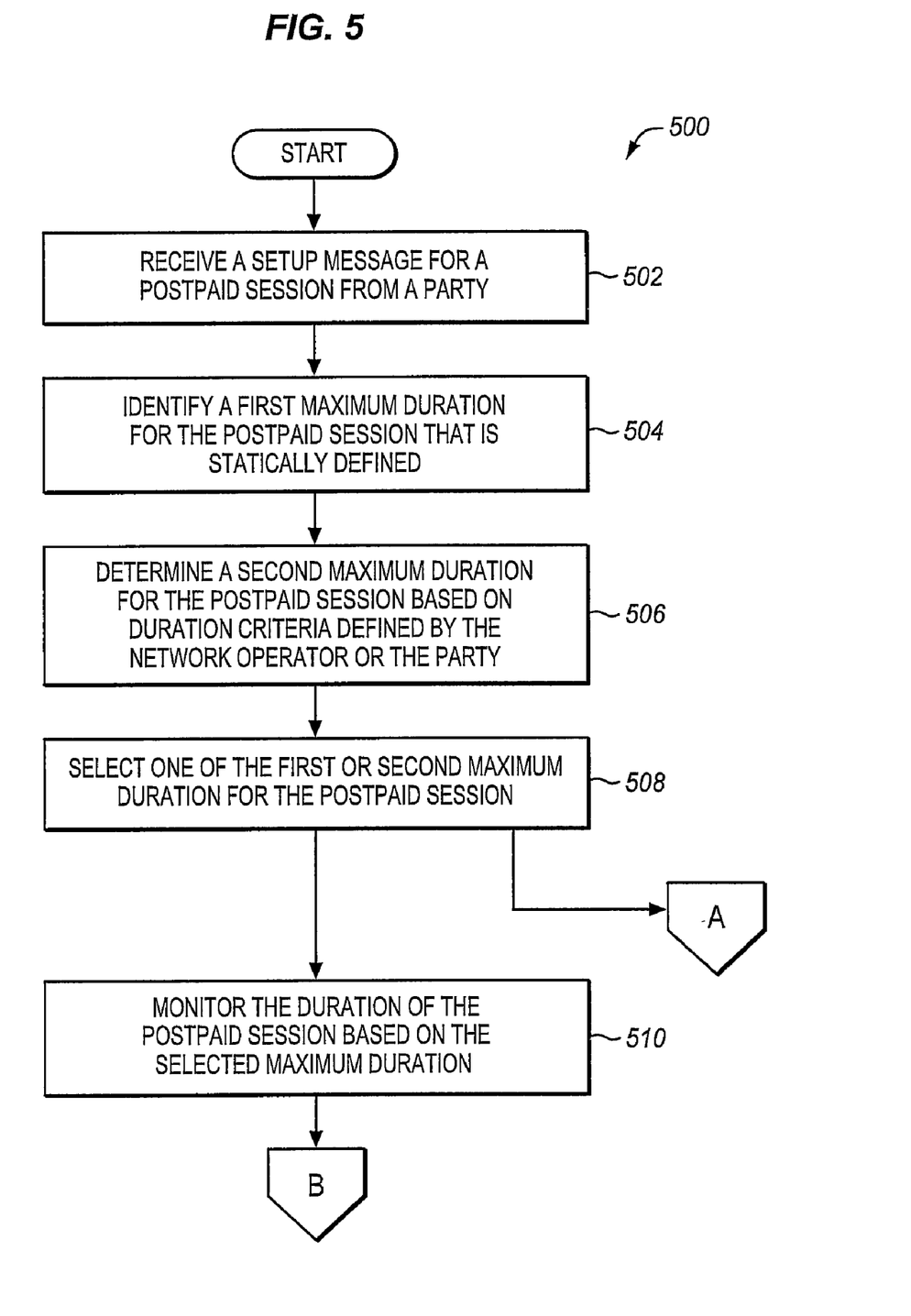
FIG. 5 is a flow chart illustrating a method of providing dynamically-configurable maximum durations for postpaid sessions in an exemplary embodiment of the invention.

FIG. 5 is a flow chart illustrating a method 500 of providing dynamically-configurable maximum durations for postpaid sessions in an exemplary embodiment of the invention. The steps of method 500 will be described with reference to communication network 100 in FIG. 1. The steps of the flow chart in FIG. 5 are not all inclusive and may include other steps not shown. The steps of method 500 are described as being performed by session control function 102, but one or more of the steps of method 500 may be performed by another node or nodes in communication network 100, such as subscriber server 104.

In step 502, session control function 102 receives a setup message to initiate a postpaid session. The setup message may comprise a SIP INVITE message, an ISUP IAM message, or another type of message. The postpaid session may comprise any type of session (or call), such as a voice session, a data session (e.g., email, Internet, or IM), a gaming session, etc.

Responsive to the postpaid session being initiated, session control function 102 identifies a first maximum duration for the postpaid session that is statically defined in communication network 100 in step 504. As previously discussed, communication network 100 includes a static maximum duration, such as 72 hours, that is programmed into network nodes, such as session control function 102. This static maximum duration applies to all prepaid and postpaid sessions in communication network 100.

In step 506, session control function 102 determines a second maximum duration for the postpaid session that is dynamically-configurable based on the duration criteria that is defined by the network operator and/or party 110. In step 508, session control function 102 selects the first maximum duration or the second maximum duration for the postpaid session based on the duration criteria. Session control function 102 may select the maximum duration for the postpaid session in a variety of ways based on policies or rules included in the duration criteria. In one example, session control function 102 may select the maximum duration that is the shortest. For instance, if the first "static" maximum duration is 72 hours and the second "dynamic" maximum duration is 1 hour, then session control function 102 may select the dynamic maximum duration which has the shortest length of 1 hour. In another example, session control function 102 may select the second "dynamic" maximum duration for all postpaid sessions in communication network 100. Session control function 102 may also operate as described in FIG. 3 to notify party 110 of the selected maximum duration for the postpaid session.

After the maximum duration for the postpaid session is selected and notification is optionally performed, the postpaid session is established over communication network 100. The postpaid session may be connected to application server 140 in communication network 100, such as a gaming server, an email server, etc, such as for a data session. The postpaid session may alternatively be connected to another party (not shown) in communication network 100 or another network, such as for a voice call. During the postpaid session, session control function 102 monitors the duration of the postpaid session based on the selected maximum duration in step 510. Session control function 102 monitors when the postpaid session reaches or is close to reaching the selected maximum duration for the postpaid session.

Example

The following illustrates a maximum duration service in communication network 100 for a prepaid session. Assume that party 110 dials into application server 140, which is a gaming server in this example. Responsive to initiating the gaming session, session control function 102 identifies the static (default) maximum duration for sessions in communication network 100, which is 72 hours. Session control function 102 also identifies a calculated maximum duration for the gaming session based on a prepaid account for party 110. Assume that the start time for the gaming session is Saturday and party 110 has a free night and weekend plan. The calculated maximum duration for the gaming session is thus unlimited. Session control function 102 also determines a dynamic maximum duration for the gaming session based on duration criteria. Assume that the duration criteria define that the gaming session has a dynamic maximum duration of 24 hours. Session control function 102 then selects one of the static maximum duration, the calculated maximum duration, or the dynamic maximum duration based on the duration criteria. Assume for this example that session control function 102 selects the dynamic maximum duration based on the duration criteria, which is 24 hours.

Session control function 102 then determines that pre-session notification is proper to inform party 110 of the selected maximum duration. Session control function 102 then plays a pre-session announcement to party 110 informing party of the 24 hour maximum duration. Session control function 102 may also prompt party 110 to determine if party 110 wants to alter the selected maximum duration. Optionally, session control function 102 may announce the rate of the gaming session (such as $6.00/hour). If party 110 determines that the cost of 24 hours of gaming is too high, then party 110 may decide to limit him/her to 6 hours of gaming. Party 110 may then follow the instructions provided by session control function 102 to enter a new selected maximum duration of 6 hours.

Session control function 102 then establishes the gaming session and monitors the duration of the session based on the new selected maximum duration, which is 6 hours. At the end of 6 hours, session control function 102 determines whether the session is extendible. If so, then session control function 102 notifies party 110 that the session has reached or is reaching the new selected maximum duration of 6 hours, and that the session may be extended. If party 110 wants to extend the gaming session by 2 hours, then party 110 enters the proper commands to request the extension of 2 hours. Session control function 102 receives the request to extend the gaming session by 2 hours, and determines whether the gaming session may be extended by this time period. If so, session control function 102 extends the maximum duration by 2 hours, and plays an announcement to party 110 indicating the new maximum duration. If party 110 subsequently ends the gaming session before the new maximum duration is reached, then session control function 102 records a total elapsed time for the gaming session, generates a call data record (CDR) for the charging for the gaming session, and transmits the CDR to charging system 108.

Although specific embodiments were described herein, the scope of the invention is not limited to those specific embodiments. The scope of the invention is defined by the following claims and any equivalents thereof.

I claim:

1. A system comprising:
a session control function of a communication network adapted to receive a setup message from a party to initiate a prepaid session;
the session control function is further adapted to identify a first maximum duration for the prepaid session that is statically defined in the communication network, to calculate a second maximum duration for the prepaid session based on a prepaid account balance for the party, and to determine a third maximum duration for the prepaid session based on duration criteria after the prepaid session is initiated, wherein the duration criteria comprise pre-defined policies that control how maximum durations are dynamically determined on a session-by-session basis at initiation of the sessions;

the session control function is further adapted to select one of the first, second, or third maximum duration for the prepaid session, and to monitor the duration of the prepaid session based on the selected maximum duration responsive to the prepaid session being established over the communication network.

2. The system of claim 1 wherein the session control function is further adapted to:
determine whether to notify the party of the selected maximum duration based on the duration criteria; and
notify the party of the selected maximum duration responsive to a determination to notify the party.

3. The system of claim 2 wherein the session control function is further adapted to:
determine a media type for notifying the party of the selected maximum duration based on the duration criteria; and
notify the party of the selected maximum duration based on the determined media type.

4. The system of claim 1 wherein the session control function is further adapted to:
determine that the duration of the prepaid session has substantially reached the selected maximum duration;
determine a media type for notifying the party; and
notify the party that the duration of the prepaid session has substantially reached the selected maximum duration based on the determined media type.

5. The system of claim 4 wherein the session control function is further adapted to:
determine if the duration of the prepaid session is extendible beyond the selected maximum duration based on the duration criteria;
notify the party that the duration of the prepaid session is extendible responsive to a determination that the duration of the prepaid session is extendible; and
terminate the prepaid session responsive to a determination that the duration of the prepaid session is not extendible and responsive to the duration of the prepaid session reaching the selected maximum duration.

6. The system of claim 5 wherein the session control function is further adapted to:
receive a request from the party to extend the duration of the prepaid session by a time period;
determine whether the prepaid session is allowed to be extended by the time period based on the duration criteria; and
extend the selected maximum duration by the requested time period responsive to a determination that the prepaid session is allowed to be extended by the time period.

7. The system of claim 1 wherein the session control function is further adapted to:
select the one of the first, second, or third maximum duration having the shortest duration.

8. The system of claim 1 wherein the session control function is further adapted to:
determine the third maximum duration based on the type of session including at least a toll session, a toll-free session, and an emergency session.

9. The system of claim 1 wherein the session control function is further adapted to:
determine the third maximum duration based on at least one of the media type for the prepaid session, a tariff for the prepaid session, and the time of day or day of the week for the prepaid session.

10. The system of claim 1 wherein the session control function is further adapted to:
determine the third maximum duration based on the access network used by the party for the prepaid session.

11. The system of claim 1 wherein the session control function is further adapted to:
determine the third maximum duration based on characteristics in the communication network.

12. The system of claim 1 wherein the session control function is further adapted to:
determine the third maximum duration based on a maximum duration defined by the party.

13. A method of providing dynamically-configurable maximum durations for prepaid sessions over a communication network, the method comprising:
receiving a setup message for a prepaid session;
identifying a first maximum duration for the prepaid session that is statically defined in the communication network;
calculating a second maximum duration for the prepaid session based on a prepaid account balance for a party participating in the prepaid session;
determining a third maximum duration for the prepaid session based on duration criteria after the prepaid session is initiated, wherein the duration criteria comprise pre-defined policies that control how maximum durations are dynamically determined on a session-by-session basis at initiation of the sessions;
selecting one of the first, second, or third maximum duration for the prepaid session; and
monitoring the duration of the prepaid session based on the selected maximum duration responsive to the prepaid session being established over the communication network.

14. The method of claim 13 further comprising:
determining whether to notify the party of the selected maximum duration based on the duration criteria; and
notifying the party of the selected maximum duration responsive to a determination to notify the party.

15. The method of claim 14 further comprising:
determining a media type for notifying the party of the selected maximum duration based on the duration criteria; and
notifying the party of the selected maximum duration based on the determined media type.

16. The method of claim 13 further comprising:
determining that the duration of the prepaid session has substantially reached the selected maximum duration;
determining a media type for notifying the party; and
notifying the party that the duration of the prepaid session has substantially reached the selected maximum duration based on the determined media type.

17. The method of claim 16 further comprising:
determining if the duration of the prepaid session is extendible beyond the selected maximum duration based on the duration criteria;
notifying the party that the duration of the prepaid session is extendible responsive to a determination that the duration of the prepaid session is extendible; and
terminating the prepaid session responsive to a determination that the duration of the prepaid session is not extendible and responsive to the duration of the prepaid session reaching the selected maximum duration.

18. The method of claim 17 further comprising:
receiving a request from the party to extend the duration of the prepaid session by a time period;
determining whether the prepaid session is allowed to be extended by the time period based on the duration criteria; and extending the selected maximum duration by the requested time period responsive to a determination that the prepaid session is allowed to be extended by the time period.

19. The method of claim 13 wherein selecting one of the first, second, or third maximum duration comprises:
   selecting the one of the first, second, or third maximum duration having the shortest duration.

20. The method of claim 13 wherein determining a third maximum duration for the prepaid session that is dynamically-configurable based on duration criteria comprises:
   determining the third maximum duration based on the type of session including at least a toll session, a toll-free session, and an emergency session.

21. The method of claim 13 wherein determining a third maximum duration for the prepaid session that is dynamically-configurable based on duration criteria comprises:
   determining the third maximum duration based on at least one of the media type for the prepaid session, a tariff for the prepaid session, and the time of day or day of the week for the prepaid session.

22. The method of claim 13 wherein determining a third maximum duration for the prepaid session that is dynamically-configurable based on duration criteria comprises:
   determining the third maximum duration based on the access network used by the party for the prepaid session.

23. The method of claim 13 wherein determining a third maximum duration for the prepaid session that is dynamically-configurable based on duration criteria comprises:
   determining the third maximum duration based on characteristics in the communication network.

24. The method of claim 13 wherein determining a third maximum duration for the prepaid session that is dynamically-configurable based on duration criteria comprises:
   determining the third maximum duration based on a maximum duration defined by the party.

25. The method of claim 24 wherein:
   the party subscribes to a joint service plan; and
   the duration criteria defined for the party includes maximum durations defined for each member of the joint service plan.

26. A system comprising:
   a session control function of a communication network adapted to receive a setup message from a party to initiate a postpaid session;
   the session control function is further adapted to identify a first maximum duration for the postpaid session that is statically defined in the communication network, and to determine a second maximum duration for the postpaid session that is dynamically-configurable based on the duration criteria after the postpaid session is initiated, wherein the duration criteria comprise pre-defined policies that control how maximum durations are dynamically determined on a session-by-session basis at initiation of the sessions;
   the session control function is further adapted to select one of the first or second maximum duration for the postpaid session, and to monitor the duration of the postpaid session based on the selected maximum duration responsive to the postpaid session being established over the communication network.

27. The system of claim 26 wherein the session control function is further adapted to:
   determine whether to notify the party of the selected maximum duration based on the duration criteria;
   determine a media type for notifying the party of the selected maximum duration based on the duration criteria; and
   notify the party of the selected maximum duration responsive to a determination to notify the party based on the determined media type.

28. The system of claim 26 wherein the session control function is further adapted to:
   determine that the duration of the postpaid session has substantially reached the selected maximum duration; and
   notify the party that the duration of the postpaid session has substantially reached the selected maximum duration.

29. The system of claim 28 wherein the session control function is further adapted to:
   determine if the duration of the postpaid session is extendible beyond the selected maximum duration based on the duration criteria;
   notify the party that the duration of the postpaid session is extendible responsive to a determination that the duration of the postpaid session is extendible; and
   terminate the postpaid session responsive to a determination that the duration of the postpaid session is not extendible and responsive to the duration of the postpaid session reaching the selected maximum duration.

30. The system of claim 29 wherein the session control function is further adapted to:
   receive a request from the party to extend the duration of the postpaid session by a time period;
   determine whether the postpaid session is allowed to be extended by the time period based on the duration criteria; and
   extend the selected maximum duration by the requested time period responsive to a determination that the postpaid session is allowed to be extended by the time period.

31. The system of claim 26 wherein the session control function is further adapted to:
   select the one of the first or second maximum duration having the shortest duration.

32. A method of providing dynamically-configurable maximum durations for postpaid sessions over a communication network, the method comprising:
   receiving a setup message for a postpaid session from a party to the postpaid session;
   identifying a first maximum duration for the postpaid session that is statically defined in the communication network;
   determining a second maximum duration for the postpaid session based on duration criteria after the postpaid session is initiated, wherein the duration criteria comprise pre-defined policies that control how maximum durations are dynamically determined on a session-by-session basis at initiation of the sessions;
   selecting one of the first or second maximum duration for the postpaid session; and
   monitoring the duration of the postpaid session based on the selected maximum duration responsive to the postpaid session being established over the communication network.

33. The method of claim 32 further comprising:
   determining whether to notify the party of the selected maximum duration based on the duration criteria;
   determining a media type for notifying the party of the selected maximum duration based on the duration criteria; and notifying the party of the selected maximum duration responsive to a determination to notify the party based on the determined media type.

34. The method of claim 32 further comprising:

determining that the duration of the postpaid session has substantially reached the selected maximum duration; and notifying the party that the duration of the postpaid session has substantially reached the selected maximum duration.

35. The method of claim 34 further comprising:

determining if the duration of the postpaid session is extendible beyond the selected maximum duration based on the duration criteria;

notifying the party that the duration of the postpaid session is extendible responsive to a determination that the duration of the postpaid session is extendible; and terminating the postpaid session responsive to a determination that the duration of the postpaid session is not extendible and responsive to the duration of the postpaid session reaching the selected maximum duration.

36. The method of claim 35 further comprising:

receiving a request from the party to extend the duration of the postpaid session by a time period;

determining whether the postpaid session is allowed to be extended by the time period based on the duration criteria; and extending the selected maximum duration by the requested time period responsive to a determination that the postpaid session is allowed to be extended by the time period.

37. The method of claim 32 wherein:

the party subscribes to a joint service plan; and the duration criteria defined for the party includes maximum durations defined for each member of the joint service plan.

38. The method of claim 32 wherein selecting one of the first or second maximum duration comprises:

selecting the one of the first or second maximum duration having the shortest duration.

* * * * *

UNITED STATES PATENT AND TRADEMARK OFFICE
CERTIFICATE OF CORRECTION

PATENT NO. : 8,355,487 B2
APPLICATION NO. : 11/833763
DATED : January 15, 2013
INVENTOR(S) : Cai et al.

It is certified that error appears in the above-identified patent and that said Letters Patent is hereby corrected as shown below:

In the Specification, column 8, line 25, "many determinations hi" should read
-- many determinations in --

Signed and Sealed this
Eighteenth Day of June, 2013

Teresa Stanek Rea
*Acting Director of the United States Patent and Trademark Office*